United States Patent

[11] 3,607,877

| [72] | Inventor | Penelope B. Domenico<br>Danville, Calif. |
|---|---|---|
| [21] | Appl. No. | 772,429 |
| [22] | Filed | Oct. 31, 1968 |
| [45] | Patented | Sept. 21, 1971 |
| [73] | Assignee | The Dow Chemical Company<br>Midland, Mich. |

[54] PROCESS FOR CONVERTING AROMATIC THIOLS TO NITROSO AND NITRO COMPOUNDS
2 Claims, No Drawings

[52] U.S. Cl. ........................................ 260/290,
260/645, 260/295, 260/646, 260/647, 260/607,
260/465, 260/469, 260/505, 260/294.9,
260/295.5, 260/294.8, 260/609, 424/263,
424/266, 424/317, 424/335, 424/337, 424/349,
71/94, 71/100, 71/105, 71/114, 71/125
[51] Int. Cl. ...................................... C07d 31/40
[50] Field of Search ............................. 260/290,
294.9, 294.8, 295, 295.5, 645, 646, 647, 607, 609,
465, 469, 505

[56] References Cited
OTHER REFERENCES

Chemical Abstracts, vol. 51, col. 15446-47 (Kiprianov et al. article) (1957)

Bittner, Berichte, vol. 35, p. 2933-36 (1902)

*Primary Examiner*—Henry R. Jiles
*Assistant Examiner*—Harry I. Moatz
*Attorneys*—Griswold & Burdick, D. J. Dewitt and C. Kenneth Bjork

ABSTRACT: A process is disclosed for converting aromatic thiols to the corresponding nitroso- or nitro-substituted compounds by treating the thiol compounds with an excess of nitric acid having a $HNO_3$ concentration of 90 to 100 percent. Representative starting compounds are benzenethiols and pyridinethiols which, in addition to the thiol group, are substituted with one or more electron-with-drawing groups such, for example, as chloro, nitro or cyano, among others. The nitroso and nitro compounds produced during the reaction have utility as pesticides and are variously effective as herbicides and in the control of fungi and nematodes as well as of parasites infecting warmblooded animals.

PROCESS FOR CONVERTING AROMATIC THIOLS TO NITROSO AND NITRO COMPOUNDS

SUMMARY OF THE INVENTION

The present invention is directed to a novel method for the production of nitroso- or nitro-substituted aromatic compounds, the method being one wherein a thiol group on the ring of a predetermined aromatic compound is selectively converted to a nitroso or a nitro group by reacting the compound with an excess of nitric acid having a $HNO_3$ concentration of from about 90 to 100 percent. The reaction proceeds through the nitroso to the nitro compound and can be terminated at the nitroso stage if desired. A sulfonic acid byproduct formed by way of a competing reaction during the process can readily be converted to the starting thiol compound, if desired. The nitroso- and nitro-substituted aromatic compounds formed by a practice of this invention are effective pesticides. Thus, they are variously useful in the control of weeds and of nematodes and fungi which are deleterious to growing plants. They are also useful in the control of parasites infecting warm-blooded animals.

More particularly, the invention is directed to a process which comprises contacting an excess of nitric acid having a $HNO_3$ concentration of about 90 to 100 percent with an aromatic compound which is substituted on its ring by a thiol group and by at least one electron-withdrawing group which is not detrimentally reactive with nitric acid under the reaction conditions employed. Representative nonreactive, electron-withdrawing groups of this character include, for example, halo (by which is meant chloro, bromo and fluoro), nitro, cyano, carboxyl, trifluoromethyl, methylsulfonyl, sulfo and thiomethyl groups.

The invention has been found to possess particular utility in connection with carbocyclic aromatic compounds including benzenethiol derivatives and with nitrogen-containing heterocyclic aromatic compounds including pyridinethiol derivatives. Accordingly, the process will be more particularly described hereinafter as it relates to the use of such compounds. However, the method of the present invention is not limited to these materials for, aided by the teaching made herein, one skilled in the art can assess the utility of the present novel process as regards operable aromatic compounds other than the aforesaid phenyl or pyridyl derivatives.

Representative thiol-substituted reactants which can be employed in a practice of this invention include:

2,3,5-trichloro-4pyridinethiol,
3,5-dichloro-2,6-difluoro-4-pyridinethiol,
2,3,5,6-tetrabromo-4-pyridinethiol,
2,3,5,6-tetrachloro-4-pyridinethiol,
3,5,6-trichloro-4-mercaptopicolinonitrile,
3,5,6-trichloro-4mercaptopicolinic acid,
2,3,5-trichloro-6-(methylsulfonyl)-4-pyridinethiol,
2,3,5-trichloro-6-trifluoromethyl)-4-pyridinethiol,
5-nitro-2-pyridinethiol,
6-mercaptonicotinic acid,
2-mercaptonicotinic acid,
6-mercaptonicotinonitrile,
2-mercapto-3-pyridinesulfonic acid,
3,4-dichloro-5-pyridinethiol,
2,3,5-trichloro-4-pyridinethiol,
2,3,6-trichloro-4-pyridinethiol,
3,5,6-trichloro-2-pyridinethiol,
2,6-dichloro-4-pyridinethiol,
2-chloro-5-pyridinethiol,
o- and m-mercaptobenzoic acid,
p-chlorobenzenethiol,
pentachlorobenzenethiol,
o-nitrobenzenethiol,
p-mercaptobenzenesulfonic acid,
m- and p-(trifluoromethyl)benzenethiol and
o- and p-(thiomethyl)benzenethiol.

Generally, in carrying out the process of this invention, the reactants are contacted with one another, with agitation, at temperatures of from about minus 20° C. up to about 120° C. and are maintained at this temperature for a predetermined period of time. While either reactant can be added to the other, the preferred practice is to add the thiol reactant to the nitric acid, thereby ensuring the presence of excess nitric acid during the entire reactive process. This preferred method has the advantages of reducing or even eliminating any carbonization of the thiol compound and of maximizing the yield of the desired nitroso and/or nitro products.

Usually, in the practice of the invention, the reactants are contacted in a first reaction stage at a temperature of from about minus 20° C. up to about positive 25° C. The corresponding nitroso product is formed rapidly during this initial stage of the reaction as the reactants are brought together, this phase of the reaction normally being complete by the time the reactants have been mixed together, or within a few moments thereafter. Typical reaction times for this stage of the process range from about 1 second to 10 or 20 minutes or even longer, depending somewhat on the length of time taken to add the thiol compound to the acid. As indicated above, the temperature of the reaction mixture in this initial reaction stage should be maintained between about minus 20° C. and positive 25° C. The nitroso compound undergoes conversion to the corresponding nitro compound as the reaction mixture is brought to temperatures above about 25° C., or even when it is allowed to stand at this or a lower temperature for any considerable period of time. Accordingly, when the nitroso product is that which is to be recovered, the reaction may be terminated before any significant conversion of the nitroso to the product has occurred. The progress of the reaction can be followed by appropriate analytical methods such, for example, as by subjecting aliquots of the reaction mixture to infrared analysis from time to time. Such tests show that nitroso groups show up immediately, while nitro groups do not appear to any significant extent for some considerable period of time provided the temperature of the reaction mixture is kept below about 25° C. If the nitroso compound is the desired product, termination of the reaction at the nitroso stage can be effected, for example, by pouring the reaction mixture into cold water, thereby separating out the nitroso product while leaving sulfonic acid byproduct in solution. The nitroso product can be recovered by appropriate separating methods, after which it can be washed free of residual acid and other impurities.

In those cases where a corresponding nitro product is desired, the reaction is continued beyond the interval required to form the nitroso compound. This phase of the reaction is favored by the use of relatively higher temperatures such as from about 25° C. to 120° C., and preferably from about 80° C. to 120° C. Good results can be obtained, once the initial nitroso-forming reaction is complete, by gradually raising the temperature of the reaction mixture, with stirring, thereby promoting the reaction which is formative of nitro product and facilitating the release of byproduct gases from the mixture as it becomes progressively less viscous at higher temperatures. In typical operation, the conversion of nitroso to nitro product is complete in periods of from about 1/2 to 2 or 3 hours as temperatures are gradually raised from a level of about 25° C., for example, to one of from about 80° C. to 120° C. The progress of the reaction can be followed by the use of infrared or other analytical methods whereby product aliquots can be monitored for the presence of nitro and nitroso groups, the reaction being complete when the nitroso groups essentially disappear. The resulting nitro product can be separated out by pouring the reaction mixture into cold water, after which it can be recovered by appropriate separating methods. The recovered product may be purified by conventional washing procedures or the like.

The reaction of the present invention is carried out using an excess of nitric acid having a $HNO_3$ concentration of from about 90 to 100percent. Approximately 2 moles of nitric acid are required to form one mole of nitroso product, while approximately 3 moles of nitric acid are required to form the nitro product, based on the thiol-substituted starting compound. The excess of nitric acid employed should be at least 100 mole percent above that required stoichiometrically for the preparation of the nitroso compound. Thus, the minimal amount of nitric acid to be employed in carrying out the present process is 4 moles per mole of the thiol starting compound. A preferred ratio is one of at least 10 moles of nitric acid per mole of thiol compound, and a more preferred minimum ratio is one of at least 20 moles of nitric acid per mole of thiol compound inasmuch as this amount of acid tends to insure that all the thiol compound added is quickly dissolved in the acid. Further, this larger excess of acid makes for reaction mixtures which are less viscous and which thus permit of an easier escape of the effluent byproduct gases which are evolved, particularly during the latter stage of the reaction when nitroso groups are being converted to nitro groups. Good results have also been obtained with acid/thiol ratios as high as 50:1 or even 100:1.

Reference has been made above to the fact that a sulfonic acid byproduct (wherein the thiol group of the starting compound is converted to a sulfo group, $-SO_3H$) is formed in significant amounts (usually of the order of about 25 to 50 percent) in carrying out the process of the present invention. While these sulfonic acid compounds have utility as pesticides and the like, they also are capable of being readily converted to the thiol starting compound. This can be accomplished in known manner by reacting the sulfonic acid compound with alkali metal compounds such, for example, as a chloride, sulfate or hydroxide of sodium or potassium to form a salt, and then reacting the salt with an aqueous solution of sodium sulfide to form the desired thiol compound. The latter step is usually effected by employing a moderate excess of the sodium sulfide and by refluxing the solution for from about 1 to 3 hours. The thiol product can be precipitated from solution by acidifying the resulting reaction mixture. The precipitate, on being recovered, can be dried, or first washed and then dried, following which it is ready to be returned to the reaction zone, if desired, for reaction with concentrated nitric acid to produce the desired nitroso or nitro product. The process of this invention thus lends itself well to efficient recycle operation.

The reactions which take place in the present invention leading to the formation of nitroso and nitro compounds are somewhat exothermic. However, due to the large excess of nitric acid which is employed, external heat may be required to maintain the reaction mixture at the desired temperature, particularly during the latter, nitro-forming stage of the reaction when reaction temperatures are being gradually increased throughout a range of about 25° C. to 120° C. Conversely, the reaction mixture is frequently cooled during the initial steps of the reaction when the thiol starting material is reacting with the nitric acid to form the nitroso derivative. This is particularly true when it is desired to recover a nitroso product, and in some instances it may be necessary to maintain the temperature at relatively low levels in order to prevent the formation of nitro product.

In practicing the present invention, it is important that the thiol reactant be substantially free of any moisture content in order to favor reactions leading to nitroso and nitro products rather than the sulfonic acid product. Since the thiol is a solid when first contacted with the acid, moisture present in the thiol results in high local dilution of the acid during the first few seconds of the reaction. Thus, while some nitroso (or nitro) product may be obtained when the thiol compound contains as much as 0.1 percent by weight moisture, preferably the thiol compound is substantially anhydrous. Oven drying in vacuo or drying of the thiol compound by other desiccating means prior to use is recommended.

The reaction pressures are not critical and good results can be obtained at elevated or reduced pressures, as well as at atmospheric pressures which are preferred.

In a typical procedure for carrying out the process according to the present invention, an anhydrous thiol compound is gradually added to stirred nitric acid having a $HNO_3$ concentration of from about 90—100 percent, the nitric acid being present in an amount of at least about 10 or 20 moles for each mole of the thiol. If a nitroso product is that which is to be recovered, the temperature is held within a range of minus 20° C. to about positive 25° C. and the reaction is terminated by pouring the reaction mixture into ice water as soon as all the thiol compound has been added or within a few minutes thereafter. In some cases the reaction mixture can be allowed to stand for longer periods, as for example, an hour or more, before being poured into water without engendering any appreciable formation of nitro product provided the reaction temperatures are kept below about 25° C. The nitroso product precipitates out and can readily be filtered off or otherwise separated and purified by washing with water. When a nitro product is to be recovered, essentially this same procedure is followed, except that at the conclusion of the addition of the thiol reactant, or when the nitroso-forming stage of the reaction is complete, the temperature of the stirred reaction mixture is gradually increased up to a maximum of about 120° C. and usually to from about 80° C. (thereby allowing gases formed during the reaction to escape without causing undue frothing of the mixture) and is maintained at these elevated temperatures until it is determined by infrared analysis or otherwise that the nitroso product has been fully converted to nitro product. The nitro product can be recovered in the same fashion as discussed above for the nitroso product. The sulfonic acid byproduct remaining in the reaction mixture can then be recovered and employed as such, or it may be converted to the starting thiol compound as described hereinbefore for further reaction with nitric acid.

Any suitable reactor can be employed for contacting and maintaining the reactants at appropriate temperatures, either by cooling or heating the same. The inlets, outlets and interior surfaces of the reactor must be of materials which are known to resist corrosion by nitric acid at the moderately high reaction temperatures employed in this reaction. Thus such surfaces can be lined with nickel, carbon, silica, glass or the like nitric acid resistant materials. In practice, it has been found that thermally resistant, high silica glass such as Vycor brand is satisfactory for small reaction systems. In large scale apparatus, it is convenient to employ a shell of nickel lined with fused silica or a suitable refractory material such as carbon.

DESCRIPTION OF THE PREFERRED EMBODIMENTS

The following examples illustrate the invention but are not to be construed as limiting.

EXAMPLE 1.

a. Anhydrous 2,3,5,6-tetrachloro-4-pyridinethiol (200g., 0.804mole) is slowly added with stirring over the course of about 10 minutes to 800 ml. of nitric acid having a $HNO_3$ concentration of 100 percent (approximately 20 moles) in a glass reaction vessel. The temperature of the reaction mixture is controlled at about 10° C. during this addition period and for an interval of 15 minutes thereafter, at which time infrared analysis discloses the presence of nitroso groups and the absence of thiol groups. The temperature of the stirred reaction mixture is then gradually brought up to 110° C. over the course of a 5 hour period, at which time infrared analysis discloses the product to be free of nitroso groups and to contain nitro groups. At this point the reaction is terminated by cooling the mixture to from about 40° C. to 50° C. The resulting product mixture is poured into ice water whereupon a light tan material precipitates; this product is filtered off and washed with water. Elemental chemical analysis of this material discloses it to have carbon, chlorine and nitrogen contents of 23.12, 53.72 and 10.39 percent, respectively, as against theoretical values of 23.0, 54.0 and 10.6 percent, respectively, for the product 2,3,5,6 -tetrachloro-4-nitropyridine. The identity of this product, which is recovered in a yield of 61.2 percent and has a melting point of 68.2° C., is confirmed by infrared analysis.

b. The filtrate obtained after separating off the precipitated nitropyridine product, as discussed above, is treated with an aqueous solution of sodium chloride, thereby including precipitation of the sodium salt of the 2,3,5,6-tetrachloro-4-pyridinesulfonic acid formed during the reaction. This precipitate is recovered and added to an aqueous solution of sodium sulfide present in approximately 10 percent excess over the equivalent amount required to convert the sulfo groups to thiol groups. The resulting aqueous reaction mixture is refluxed for a period of about 3 hours, following which it is acidified with H hydrochloric acid, thus precipitating out the starting compound, 2,3,5,6 -tetrachloro-4-pyridinethiol which is filtered off and washed. After being carefully dried it is ready for use in forming additional nitroso or nitro products by reaction with the concentrated acid.

EXAMPLE 2.

The procedure of example 1 a is repeated, but using nitric acid having a concentration of 90 percent rather than 100 percent. This operation is productive of 2,3,5,6,-tetrachloro-4-nitropyridine in a yield of somewhat less than 50 percent and of a correspondingly greater amount of the pyridinesulfonic acid byproduct.

EXAMPLE 3.

a. Anhydrous 2,3,5,6, -tetrachloro-4-pyridinethiol 30 g., 0.12 mole is slowly added to 200 mil of stirred nitric acid having a HNO$_3$ concentration of 90 percent approximately 4.5 moles over the course of a 10 minute period, the temperature of the reaction mixture being 70° C. At the conclusion of the addition period, the mixture is maintained at 70° C., with stirring, for an additional 10 minutes, after which it is poured into ice water. There is recovered 2,3,5,6- tetrachloro-4-nitropyridine in a yield of 8.76 percent. No nitroso product is present.

EXAMPLE 4.

Anhydrous 2,3,5,6-tetrachloro-4-pyridinethiol 10 g., 0.0402 mole is slowly added to 40 ml. of stirred nitric acid having a HNO$_3$ concentration of 100 percent approximately 1 mole over the course of a 10 minute period during which the temperature ranged from about 40° C. to 60° C. Thereafter the mixture is stirred for an additional period of 40 minutes as temperatures are raised from 60 to 80° C. The reaction mixture is then poured over ice water, and there is recovered 2,3,5,6-tetrachloro- 4-nitropyridine in a yield of 33 percent.

EXAMPLE 5.

Ten grams 0.0402 mole of anhydrous 2,3,5,6- tetrachloro-4-10 g., 0.0402 mole is slowly added to 10 ml. of nitric acid having a HNO$_3$ concentration of 100 percent approximately 0.5 mole as the latter is stirred at a temperature of minus 20° C. The temperature of the stirred mixture is then allowed to rise slowly, it being 25° c. at the end of 1 hour following the start of the reaction. The reaction mixture is then poured into ice water, thus precipitating out a light yellow solid which, on being filtered off, washed and dried, is found to weigh 5.59 grams. Infrared and elemental analysis indicate the product to be 2,3,5,6,-tetrachloro-4-nitrosopyridine. It has a melting point of 118° C. and is found to have carbon, chlorine and nitrogen contents of 24.98, 58.38 and 11.51 percent, respectively, as against theoretical values of 24.42, 57.65 and 11.4 percent, respectively, for the said nitroso product.

EXAMPLE 6.

Anhydrous 3,5-dichloro-2,6-difluro-4-pyridine thiol (10g., 0.0463 mole) is added stepwise to 40 ml. of stirred nitric acid having a HNO$_3$ concentration of 100 percent approximately 1 mole at 0° C., the addition taking a total of approximately 10 minutes. The reaction mixture is allowed to stand for one hour, during which time the temperature rises to approximately 25° C. The temperature of the reaction mixture is then gradually raised to 100° C. over the course of 1.5 hours. At this point, infrared analysis of an aliquot indicates the presence of nitro groups and the substantial absence of nitroso groups The reaction mixture is cooled and then poured into ice water, thereby precipitating out a white waxy solid which is washed with water, taken up in dichloromethane and dried using sodium sulfate. The solvent is then removed by distillation under vacuum, leaving 1.6 grams of a pure solid product identified by infrared analysis as 3,5-dichloro-2,6-difluoro-4-nitropyridine. This is confirmed by elemental analysis which discloses the product to have carbon, chlorine and nitrogen contents of 26.8, 29.7 and 11.3 percent, respectively, as against theoretical values of 26.2, 30.9 and 12.21 percent, respectively, for the said nitropyridine compound.

EXAMPLE 7.

Anhydrous 2,3,5-trichloro-4-pyridinethiol 240 g., 1.118 mole) is added slowly to 960 ml. of stirred nitric acid having a HNO$_3$ concentration of 100 percent approximately 24 moles, the temperature of the reaction mixture rising from 0° C. to 10° C. during this addition period. Stirring is then continued for 1 hour as the temperature is gradually raised from 10° C. to 25° C., and for an additional 1 hour period as the temperature is raised from 25° C. to 93° C. The clear red reaction mixture is then poured into cold water, thereby precipitating out a product which is recovered as waxy solid. This solid is taken up in hexane, following which the hexane is distilled off. The residual liquid is then distilled under vacuum, there being recovered 85.8 g. of a product boiling at 85° C. at 2 mm. Hg which is identified by infrared and nuclear magnetic resonance analysis as 2,3,5-trichloro-4-nitropyridine. This analysis is confirmed by elemental analysis which discloses the product to have carbon, chlorine, nitrogen, oxygen and hydrogen contents of 26.41, 46.66, 12.23, 13.95 and 0.75 percent, respectively; as against theoretical values of 26.44, 46.70, 12.32, 14.1 and 0.44 percent, respectively, for the said compound.

EXAMPLE 8.

Anhydrous 2,3,5,6-tetrabromo-4, 9.1g., 0.0213 mole is slowly added over a 10 minute period to 40 ml. of stirred nitric acid having a HNO$_3$ concentration of 100 percent approximately 1 mole at minus 15° C. An aliquot taken at this time and subjected to infrared analysis discloses that the reaction formative of the nitroso product is complete. The stirred reaction mixture is then allowed to stand for 1 hour as the temperature rises to 25° C., following which the mixture is slowly heated to a temperature of 90° C. over the ensuing 1½hour period. The reaction mixture is then poured into ice water, thereby inducing the precipitation of a yellow solid which is filtered off, washed, recrystallized from hexane and dried. This product, recovered in the amount of 4.82 g., has a melting point of 132° C. and is identified by infrared analysis as 2,3,5,6-tetrabromo-4-nitropyridine. This analysis is confirmed by elemental analysis which discloses the product to have carbon, bromine, nitrogen and oxygen contents of 13.86, 72.42, 6.12 and 7.60 percent, respectively, as against theoretical values of 13.68, 72.70, 6.38 and 7.25 percent, respectively, for this compound.

EXAMPLE 9.

2,3,5-trichloro-6-(methysulfonyl-4-pyridinethiol 5g., 0.017 mole) is added slowly over a 10 minute period to 20 ml. of stirred nitric acid having a HNO$_3$ concentration of 100 percent approximately 0.5 mole at 0° C. The stirred mixture is then allowed to stand for one hour at room temperature, following which the mixture is slowly heated to 85° C. over a period of approximately 1 hour. On being poured over ice water, there is formed a yellow precipitate which is recovered, washed, recrystallized from hexane and dried. This product is identified by infrared analysis as 2,3,5-trichloro-6-methylsulfonyl-4-nitropyridine.

EXAMPLE 10.

2,3,5-Trichloro-6-(trifluoromethyl)-4-phridinethiol 9.6g., 0.034mole is added slowly over a 10 minute period to 40 ml. of stirred nitric acid having a $HNO_3$ concentration of 100 percent approximately 1 mole, the temperature rising from 0° C. at the beginning of the addition to 20° C. at the completion thereof. The stirred solution is then allowed to stand for 30 minutes at 25° C., after which the temperature is gradually raised to a level of 80° C. over a 20 minute period. The reaction mixture is then cooled to 40° C. and poured into ice water, thereby inducing the precipitation of a solid. This solid is filtered off, washed and dried, the material so obtained being 2.7 g. of a light yellow waxy product having a melting point of 32°–33° C. which is moderately soluble in water and highly soluble in acetone and benzene. It is identified by infrared analysis as 2,3,5-trichloro-6-(trifluoromethyl 4-nitropyridine.

EXAMPLE 11.

In a manner similar to that described above in example 10,3,5,6-trichloro-4-mercaptopicolinonetrile 10g., 0.0411 mole is reacted with 40 ml. of nitric acid having a $HNO_3$ concentration of 100 percent (approximately 1 mole.) On pouring the reaction mixture into ice water there is precipitated a solid product which is recovered and taken up in hexane. On distilling off the solvent there is recovered 4.82 grams of an orange, oily solid which is identified by infrared analysis as 3,5,6-trichloro-4 -nitropicolinonitrile. This analysis is confirmed by elemental analysis which discloses the compound to have carbon, chlorine, nitrogen and oxygen contents of 29.06, 41.88, 16.76 and 12.30 percent, respectively, as against theoretical values of 28.58, 42.20, 16.65 and 12.70 percent respectively, for this compound.

EXAMPLE 12.

In a manner similar to that described above in example 10,3,5,6-trichloro-4-mercaptopicolinic acid 10 g., 0.0387 mole is reacted with 40 ml. of nitric acid having a $HNO_3$ concentration of 100 percent, approximately 1 mole. On pouring the reaction mixture into ice water there is precipitated a solid product which, on being recovered, washed and dried, is identified by infrared analysis as 3,5,6-trichloro-4-nitropicolinic acid.

EXAMPLE 13.

Using substantially the same procedure as described in example 8, other nitropyridines are prepared by reacting nitric acid with the indicated thiol compound, as follows:

6-nitronicotinic acid having a molecular weight of 168.11 by the reaction of 6-mercaptionicotinic acid with nitric acid.
2,5-dinitropyridine having a molecular weight of 169.1 by the reaction of 5-nitro-2-pyridinethiol with nitric acid.
2--nitronicotinic acid having a molecular weight of 168.11 by the reaction of 2-mercaptonicotinic acid with nitric acid.
6-nitronicotinonitrile having a molecular weight of 149.11 by the reaction of 6-mercaptionicotinonitrile with nitric acid.
2-nitro-3-pyridinesulfonic acid having a molecular weight of 204.16 by the reaction of 2-mercapto-3-pyridinesulfonic acid with nitric acid.
3,6-dinitropyridine having a molecular weight of 169.1 by the reaction of 3-nitro-6-pyridinethiol with nitric acid.
3,4-dichloro-5-nitropyridine having a molecular weight of 192.99 by the reaction of 3,4-dichloro-5-pyridinethiol with nitric acid.
2,3,6-trichloro-4-nitropyridine having a molecular weight of 227.45 by the reaction of 2,3,6-trichloro-4-pyridinethiol with nitric acid.
3,5,6-trichloro-2-nitropyridine having a molecular weight of 227.45 by the reaction of 3,5,6-trichloro-2-pyridinethiol with nitric acid.
2,6-dichloro-4-nitropyridine having a molecular weight of 192.99 by the reaction of 2,6-dichloro-2-pyridinethiol with nitric acid
2-chloro-5-nitropyridine having a molecular weight of 158.54 by the reaction of 2-chloro-5-pyridinethiol with nitric acid.

EXAMPLE 14.

Pentachlorobenzenethiol (10 g., 0.0354 mole is slowly added over a period of 15 minutes to 40 ml. of stirred nitric acid having a $HNO_3$ concentration of 100 percent approximately 1 mole at minus 10° C. at the end of the addition period, the temperature is allowed to rise to about 25° C. as the stirred mixture is allowed to stand for 1 hour. An aliquot taken at this time and subjected to infrared analysis discloses the reaction mixture to contain pentachloronitrosobenzene, along with pentachlorobenzenesulfonic acid. The temperature of the stirred reaction mixture is then raised to 100° C. over the course of a further reaction period of approximately 1 hour, following which the mixture is poured into ice water. The resulting cream colored solid which forms is filtered off, washed and dried, thereby yielding 3.05 grams of solid identified by infrared analysis as pentachloronitrobenzene.

EXAMPLE 15.

In a manner similar to that described above in example 14, p-chlorobenzenethiol 5 g., 0.0346 mole is reacted with 20 ml. of the concentrated nitric acid. There is recovered approximately 1 gram of a finely divided white solid which is identified by infrared analysis as *p*-chloronitrobenzene.

EXAMPLE 16.

In a manner similar to that described above in example 14, other nitrobenzenes are prepared by reacting nitric acid with the indicated thiol compound, as follows:

o-nitrobenzoic acid having a molecular weight of 167.13 by the reaction of o-mercaptobenzoic acid with nitric acid.
o-dinitrobenzene having a molecular weight of 168.11 by the reaction of o-nitrobenzenethiol with nitric acid.
p-nitrobenzenesulfonic acid having a molecular weight of 203.18 by the reaction of p-mercaptobenzene sulfonic acid with nitric acid.
m-nitro-trifluoromethyl benzene having a molecular weight of 191.12 by the reaction of m-trifluoromethyl benzenethiol with nitric acid.
o-nitro-(thiomethyl) benzene having a molecular weight of 169.21 by the reaction of *o*-(thiomethyl) benzenethiol with nitric acid.

The compounds prepared by the method of this invention can be employed as pesticides by distributing the compound in a pesticidally effective quantity, usually in the form of a composition containing adjuvants to aid in dispersing the same, so as to contact directly the organisms to be controlled or, alternatively, so as to contact the growth medium or habitat of the organisms whereby eventual contact with said organisms will be established.

In representative operations illustrating the utility of the compounds as herbicides, it is found that weed pests such as pigweed, bindweed and barnyard grass can be controlled by the application thereto of aqueous compositions of one of 3,5,6-trichloro-4-nitropicolinic acid, 3,5-dichloro-2,6-difluoro-4-dichloro-5-nitropyridine at a level of 10 pounds of the active chemical per acre or less. An aqueous composition containing p-chloronitrobenzene is effective in the control of reed canary grass when sprayed thereon at a concentration of 10 parts of the active chemical per million parts of the spray solution.

The utility of the compounds as fungicides may be seen from the data of tests showing that aqueous compositions of 2,3,5,6-tetrachloro-4-nitropyridine or 2,3,5,6-tetrabromo -4-nitropyridine give complete kill of Rhizoctonia solani at a concentration of 0.1 part per million of the active chemical. 2,3,5-Trichloro-4-nitropyridine and 3,5 -dichloro-2,6-difluoro-4-nitropyridine give similar control of said fungal organisms at levels of 1 and 10 parts per million, respectively.

The utility of the compounds as nematocides can be seen from the fact that complete kill of soil-dwelling root knot nematodes is obtained by each of the chemicals 2,3,5,6-tetrachloro-4-nitropyridine and 2-chloro-5-nitropyridine as the latter are applied at concentrations of 3 and 25 parts, respectively, per million parts by weight of soil.

The usefulness of the compounds as anthelmintics may be seen from the fact that 100 percent control of pig ascarids is obtained by incorporating either 3,4-dichloro-5-nitropyridine or 2,3,5-trichloro-4-nitro-6(trifluoromethyl) pyridine in the diet of mice host animals at a level of 0.06 percent by weight. Similar control of mouse tapeworm is obtained by incorporating 2,3,5,6-tetrachloro-4-nitrosopyridine in the mice host animal diet at a level of 0.06 percent by weight. Pentachloronitrobenzene gives similar control of mouse pinworms at this same level in the diet.

The aromatic thiol reactants employed as starting materials in practicing the method of the invention can be prepared by methods known in the art or analogous thereto. Thus, a method which can be employed in many instances to prepare said thiols is to react the corresponding halo derivative (usually one wherein a chlorine or bromine atom is attached to the nucleus at the carbon atom were it is desired to attach the thiol group) with sodium sulfide or sodium hydrosulfide and then to acidify the resulting reaction mixture, thus forming the desired thiol compound together with sodium halide as a byproduct. The reaction proceeds as the halo derivative is refluxed with an equivalent amount of the sodium sulfide in an aqueous reaction medium for a period of about 1 to 4 hours. This method can be employed to prepare such compounds as 2-chloro-5-pyridinethiol, 3,5-dichloro-4-pyridinethiol, 2,3,6-trichloro-4-pyridinethiol, 3,5,6-trichloro-1-pyridinethiol, 2,6-dichloro-4-pyridinethiol, pentachlorobenzenethiol, 2,3,5-trichloro-4-pyridinethiol, 3,5-dichloro-2,6-difluoro-4-pyridinethiol, 2,3,5,6-tetrabromo-4-pyridinethiol, 2,3,5,6-tetrachloro-4-pyridinethiol, 3,5,6-trichloro-4 -mercaptopicolinonitrile, 2,3,6-trichloro-4-mercaptopicolinic acid, 2,3,5-trichloro-6-trifluoromethyl-4-pyridinethiol and 2,3,5-trichloro-6-trifluoromethyl-4-pyridinethiol, for example. A similar reaction of general application is one wherein the corresponding chloro derivative is heated, usually under pressure, with potassium hydrosulfide in methanol solution, potassium chloride being formed as a byproduct. Methods of this character are described in the literature for such compounds as 5-nitro-2-pyridinethiol, 6-mercaptonicotinic acid, 2-mercaptonicotinic acid, 6-mercaptonicotinic acid, 2-mercaptonicotinic acid, 6-mercaptonicotinonitrile and 2-mercaptonicotinic acid, 6-mercaptonicotinonitrile and 2-mercapto-3-pyridinesulfonic acid. o-Mercaptobenzoic acid can be prepared by reacting sodium o-chlorobenzoate with sodium sulfide in the presence of copper sulfate, followed by acidification of the mixture Swiss Pat. NO. 227,349.o-Nitrobenzenethiol can be prepared by reacting o-chloronitrobenzene with sodium sulfide in alcoholic solution (Foster, D. G. and Reid, E. E., J. A. C. S. 46,1937). p-Mercaptobenzenesulfonic acid can be prepared by reacting 4,4'-dithiobisbenzenesulfonic acid with zinc and ammonium chloride in alcoholic solution (C. A. 46, 5124c.) m-amino-(trifluoromethyl) benzene hydrochloride with sodium nitrate, potassium hydroxide and the potassium salt of ethyl xanthic acid, followed by a step in which the ether extract is reacted with potassium hydroxide and zinc. (Stacy, G. W. and Bresson, C. R., J. Org. Chem., 24, 1892. o-(Thiomethyl) benezenethiol can be prepared by reacting o-dimercaptobenze with potassium hydroxide, followed by reaction with methyl iodide and then with sulfuric acid (Parham, W. E. and Stright, P. L., J.A.C.S. 78, 4783. ). p-Chlorobenzenethiol can be prepared by reacting p-chlorobenzenesulfonic acid with zinc and sulfuric acid (Friedlander and Mauthner, Chem. Zentr., 1904 II 1176 ).

I claim:

1. The method which comprises reacting 1 a substantially anhydrous organic compound 18 in its structure an aromatic ring which is one of benzene or pyridine and which is substituted by a thiol group and by at least one member selected from the group consisting of chloro, bromo, fluoro, nitro, cyano, carbozyl, trifluoromethyl, methylsulfonyl, sulfo and thiomethyl, with 2 nitric acid having an $HNO_3$ concentration of from about 90 to 100 percent, there being employed at least 10 moles of the nitric acid per mole of said organic compound, said reaction being carried out at temperatures between about minus 20° C. and positive 25° C. whereby the said thiol group is replaced in substantial measure by a nitroso group, the starting compound being otherwise unchanged.

2. The method of claim 1 wherein there is added the step of heating the reaction mixture to temperatures of from about 80° to 120° C. to oxidize the nitroso group present to a nitro group.

UNITED STATES PATENT OFFICE

CERTIFICATE OF CORRECTION

Patent No. 3,607,877  Dated 21 September 1971

Inventor(s) Penelope B. Domenico

It is certified that error appears in the above-identified patent and that said Letters Patent are hereby corrected as shown below:

In column 2, line 30, change "the product" to -- the nitro product --.

In column 5, line 5, delete "includ-" and insert -- induc- --; in line 14 delete "H".

In column 6, line 46, delete "4," and insert -- 4-pyridinethiol --.

In column 8, line 70, delete "dichloro-5-nitropyridine" and insert -- nitropyridine, 2,3,5-trichloro-4-nitropyridine or 3,4-dichloro-5-nitropyridine --.

In column 9, line 46, delete "2,3,6" and insert -- 3,5,6 --; in line 47, delete "trifluoromethyl" and insert -- (methylsulfonyl) --.

In column 10, lines 6, 7, and 8, delete "6-mercaptonicontinic acid, 2-mercaptonicotinic acid, 6-mercaptonicotinonitrile and 2-mercaptonicotinic acid"; in line 18 after "(C. A. 46, 5124c)" insert -- m-(Trifluoromethyl)benzenethiol can be prepared by reacting --; in line 33, after "compound" cancel "18 in its structure an aromatic ring".

Signed and sealed this 18th day of July 1972.

(SEAL)
Attest:

EDWARD M. FLETCHER, JR.
Attesting Officer

ROBERT GOTTSCHALK
Commissioner of Patents